United States Patent
Locker et al.

(10) Patent No.: US 12,418,527 B2
(45) Date of Patent: Sep. 16, 2025

(54) TECHNIQUES FOR SIGNATURELESS VIRTUAL INSTANCE IMAGE VERIFICATION IN CLOUD COMPUTING ENVIRONMENTS

(71) Applicant: Wiz, Inc., New York, NY (US)

(72) Inventors: Lir Locker, Tel Aviv (IL); Bar Magnezi, Tel Aviv (IL); Amir Lande Blau, Tel Aviv (IL); Yaniv Joseph Oliver, Tel Aviv (IL); Or Heller, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/537,125

(22) Filed: Dec. 12, 2023

(65) Prior Publication Data

US 2025/0193178 A1 Jun. 12, 2025

(51) Int. Cl.
*G06F 21/57* (2013.01)
*G06F 9/455* (2018.01)
*H04L 9/40* (2022.01)

(52) U.S. Cl.
CPC .................. *H04L 63/0861* (2013.01)

(58) Field of Classification Search
None
See application file for complete search history.

(56) References Cited

U.S. PATENT DOCUMENTS

| | | | |
|---|---|---|---|
| 7,793,101 B2 | 9/2010 | Wipfel et al. | |
| 8,856,938 B2 * | 10/2014 | Dik | G06F 21/57 |
| | | | 713/187 |
| 11,646,896 B1 * | 5/2023 | Crosby | H04L 9/0866 |
| | | | 713/180 |
| 2011/0246778 A1 | 10/2011 | Duane | |
| 2022/0114243 A1 * | 4/2022 | Ross | G06F 21/6227 |
| 2023/0040577 A1 * | 2/2023 | Buendgen | G06F 21/53 |
| 2024/0311167 A1 * | 9/2024 | Powell | G06F 9/45558 |

\* cited by examiner

*Primary Examiner* — John F Mortell
(74) *Attorney, Agent, or Firm* — M&B IP Analysts, LLC

(57) ABSTRACT

A system and method for signatureless validation of objects in a computing environment, including artifacts, objects, files, virtual images, and the like. The method includes: detecting a request to deploy an instance based on a software artifact in the computing environment; generating a first fingerprint based on the software artifact in response to detecting the request to deploy the instance; querying a fingerprint database, including a plurality of validated fingerprints, to determine if the first fingerprint is stored therein; deploying the instance in response to validating the first fingerprint; and blocking deployment of the instance in response to determining the first fingerprint is not of the plurality of validated fingerprints.

23 Claims, 6 Drawing Sheets

TECHNIQUES FOR SIGNATURELESS VIRTUAL INSTANCE IMAGE VERIFICATION IN CLOUD COMPUTING ENVIRONMENTS

TECHNICAL FIELD

The present disclosure relates generally to virtual image verification, and specifically to signatureless image verification across multiple compute environments.

BACKGROUND

Cybersecurity risks are ever prevalent. One way attackers attempt to gain access to computing networks is by accessing an image (i.e., a virtual image) from which a virtual instance is deployed, and corrupting that image. From there any time a corrupt image is utilized to deploy a virtual instance, a corrupted virtual instance is deployed which is under control of an attacker. This is obviously not advantageous to anyone but the attacker.

In order to overcome this problem, one solution includes signing an image once the image is built. For example, a signed image includes a cryptographic signature which is stored together with the image. However, an attacker with access to the appropriate cryptographic key is capable of manipulating a signature as well. This also requires larger image files to be stored, as each image also stores the signature of that image.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a request to deploy an instance based on a software artifact in the computing environment. Method may also include generating a first fingerprint based on the software artifact in response to detecting the request to deploy the instance. Method may furthermore include querying a fingerprint database, including a plurality of validated fingerprints, to determine if the first fingerprint is stored therein. Method may in addition include deploying the instance in response to validating the first fingerprint. Method may moreover include blocking deployment of the instance in response to determining the first fingerprint is not of the plurality of validated fingerprints. Other embodiments of this aspect include corresponding computer systems, apparatus, and computer programs recorded on one or more computer storage devices, each configured to perform the actions of the methods.

Implementations may include one or more of the following features. Method may include: inspecting the software artifact for a cybersecurity issue; and generating a validated fingerprint based on the software artifact in response to determining that the software artifact does not include a cybersecurity issue. Method where generating the validated fingerprint is initiated by a preauthorized principal of the computing environment. Method may include: accessing an artifact file in the computing environment; generating a second fingerprint based on the artifact file; and storing the second fingerprint as a validated fingerprint in the fingerprint database. Method may include: detecting a virtual instance deployed in the computing environment; generating a fingerprint based on the deployed virtual instance; and terminating the virtual instance in response to determining that the fingerprint of the deployed virtual instance is invalid. Method may include: generating a fingerprint for each object of a plurality of objects detected in the computing environment at a first time; and storing the generated fingerprints as valid fingerprints. Method may include: generating a fingerprint for an object detected in the computing environment at a second time; and querying the fingerprint database with a fingerprint generated at the second time to determine if the fingerprint is a valid fingerprint. Method may include: determining that the object detected at the second time is an unauthorized object in response to detecting that the generated fingerprint does not match the valid fingerprints. Method may include: terminating the object detected at the second time. Method may include: initiating a remediation action. Method where the request is detected by any one of: an admission controller, a hypervisor, a sensor, and a combination thereof. Implementations of the described techniques may include hardware, a method or process, or a computer tangible medium.

In one general aspect, non-transitory computer-readable medium may include one or more instructions that, when executed by one or more processors of a device, cause the device to: detect a request to deploy an instance based on a software artifact in the computing environment. Medium may furthermore generate a first fingerprint based on the software artifact in response to detecting the request to deploy the instance. Medium may in addition query a fingerprint database, including a plurality of validated fingerprints, to determine if the first fingerprint is stored therein. Medium may moreover deploy the instance in response to validating the first fingerprint. Medium may also block deployment of the instance in response to determining the first fingerprint is not of the plurality of validated fingerprints. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect a request to deploy an instance based on a software artifact in the computing environment. System may in addition generate a first fingerprint based on the software artifact in response to detecting the request to deploy the instance. System may moreover query a fingerprint database, including a plurality of validated fingerprints, to determine if the first fingerprint is stored therein. System may also deploy the instance in response to validating the first fingerprint. System may furthermore block deployment of the instance in response to determining the first fingerprint is not of the plurality of validated fingerprints. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: inspect the software artifact for a cybersecurity issue; and generate a validated fingerprint based on the software artifact in response to determining that the software artifact does not include a cybersecurity issue. System where generating the validated fingerprint is initiated by a preauthorized principal of the computing environment. System where the memory contains further instructions which when executed by the processing circuitry further configure the system to: access an artifact file in the computing environment; generate a second fingerprint based on the artifact file; and store the second fingerprint as a validated fingerprint in the fingerprint database. System where the memory contains further instructions which when executed by the processing circuitry further configure the system to: detect a virtual instance deployed in the computing environment; generate a fingerprint based on the deployed virtual instance; and terminate the virtual instance in response to determining that the fingerprint of the deployed virtual instance is invalid. System where the memory contains further instructions which when executed by the processing circuitry further configure the system to: generate a fingerprint for each object of a plurality of objects detected in the computing environment at a first time; and store the generated fingerprints as valid fingerprints. System where the memory contains further instructions which when executed by the processing circuitry further configure the system to: generate a fingerprint for an object detected in the computing environment at a second time; and query the fingerprint database with a fingerprint generated at the second time to determine if the fingerprint is a valid fingerprint. System where the memory contains further instructions which when executed by the processing circuitry further configure the system to: determine that the object detected at the second time is an unauthorized object in response to detecting that the generated fingerprint does not match the valid fingerprints. System where the memory contains further instructions which when executed by the processing circuitry further configure the system to: terminate the object detected at the second time. System where the memory contains further instructions which when executed by the processing circuitry further configure the system to: initiate a remediation action. System where the request is detected by any one of: an admission controller, a hypervisor, a sensor, and a combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
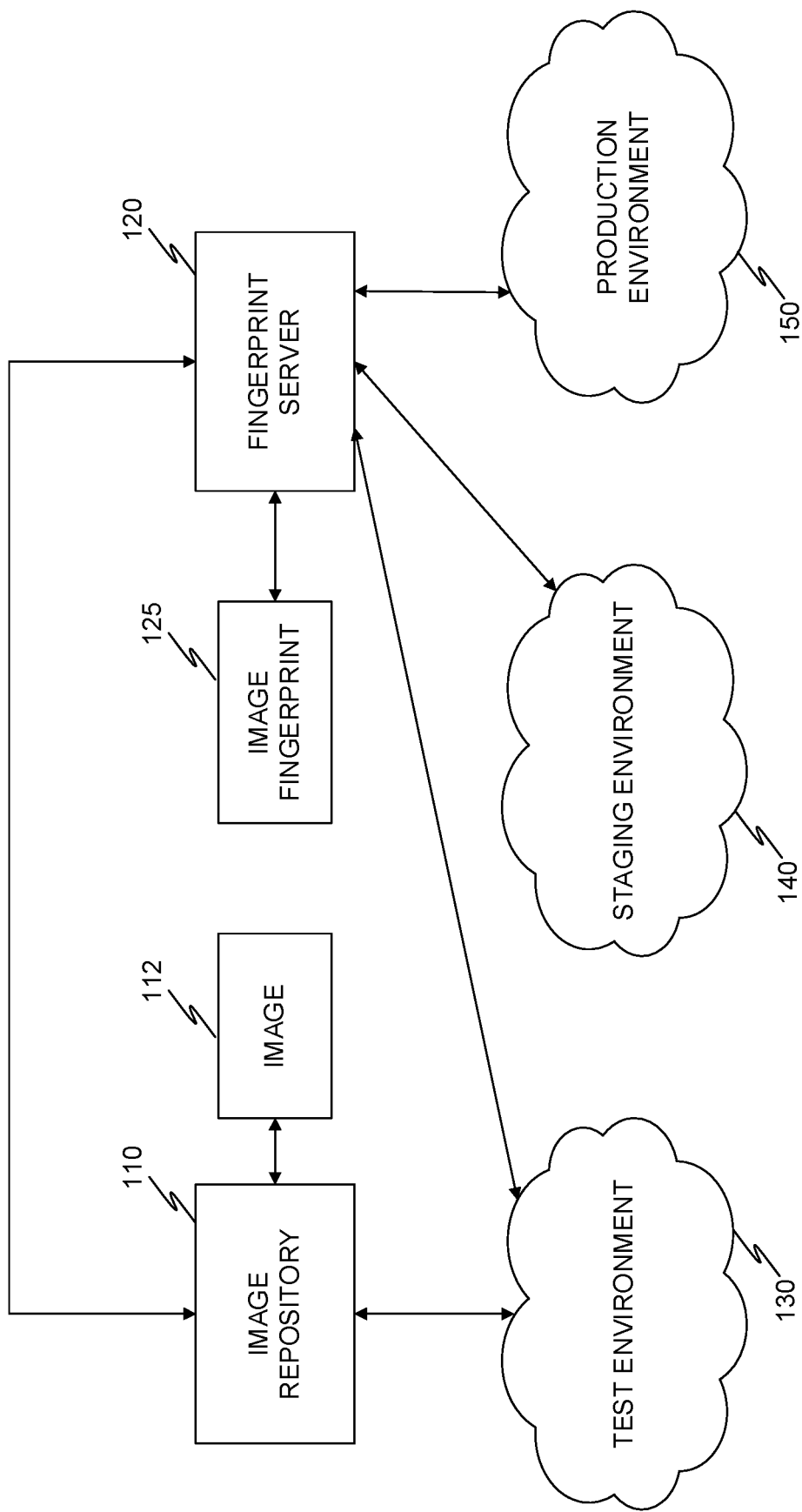
FIG. 1 is an example of a schematic diagram of a continuous integration, continuous deployment computing environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for signatureless validation of objects in a cloud computing environment. According to an embodiment, an object is an image, an artifact, a file, a binary, a library, various combinations thereof, and the like. In an embodiment, a fingerprint is generated for a validated object, and the fingerprint is stored in an accessible location, such as a fingerprint database.

According to some embodiments, validation of a virtual instance occurs at deployment, after deployment, continuously, periodically, a combination thereof, and the like. For example, in an embodiment, a fingerprint is generated of a deployed virtual instance (or other object), and the generated fingerprint is compared to fingerprint database. If a valid fingerprint is detected therein, the image, artifact, object, and the like, are valid. If a valid fingerprint is not detected, or if an invalid fingerprint is detected, a mitigation action is initiated, according to an embodiment.

In certain embodiments, a mitigation action includes terminating the image, artifact, object, etc., based on which the generated fingerprint was generated.

FIG. 1 is an example of a schematic diagram of a continuous integration, continuous deployment computing environment, utilized to describe an embodiment. According to an embodiment, continuous integration, continuous deployment (CI/CD) describes a plurality of computing environments. In an embodiment, each computing environment is implemented using a computing architecture, such as on-prem computing, cloud computing, hybrid computing, a combination thereof, and the like. In certain embodiment, the various computing environments are known as a CI/CD pipeline.

For example, according to an embodiment, a CI/CD pipeline includes a test environment 130, a staging environment 140, and a production environment 150. In an embodiment, each of the test environment 130, the staging environment 140, and the production environment 150, are implemented as a cloud computing environment, such as a virtual private cloud (VPC), a virtual network (VNet), a combination thereof, and the like.

In certain embodiments, a cloud computing environment is implemented on a cloud computing infrastructure. In some embodiments, a cloud computing infrastructure is, for example, Amazon® Web Services (AWS), Microsoft® Azure, Google® Cloud Platform (GCP), and the like.

In some embodiments, an image file 112 is generated from which a virtual instance is deployed. In an embodiment, the image file 112 is stored in an image repository 110. In some embodiments, the image repository 110 is, for example JFrog® Aritfactory®, Github®, and the like. In some embodiments, the image file 112 is referred to as a software artifact.

In certain embodiments, an image 112 is pulled from the image repository 110 into the test environment 130, to be deployed therein as a virtual instance. In some embodiments, the virtual instance is modified, altered, or otherwise changed, in the test environment 130, the staging environment 140, and the like, prior to being deployed in the production environment 150.

In some embodiments, a test environment 130 is utilized to test various functionalities of a virtual instance prior to being deployed. In certain embodiments, a staging environment 140 includes a similar, or substantially similar, environment to the production environment 150. In such embodiments, a staging environment 140 is utilized to determine functionality of a virtual instance in an environment similar to the production environment 150, to determine an effect of the virtual instance in an environment similar to the production environment 150, a combination thereof, and the like.

According to an embodiment, it is beneficial to validate an image prior to deployment in a production environment 150. In some embodiments images are validated by signing the image. For example, an image may be signed with a key, such as a cryptographic key. A validated image is an image which is indicated as being safe to deploy, according to an embodiment. However, where a key is compromised, there is a probability that validated image is compromised as well.

Therefore, rather than signing an image, according to an embodiment, a fingerprint server 120 is configured to generate an image fingerprint 125 based, for example, on an image file 112. In some embodiments, the fingerprint server 120 is configured to store a plurality of validated image fingerprints. In an embodiment, the fingerprint server 120 is configured to generate a fingerprint, a digest, and the like, at build of the image.

In an embodiment, the fingerprint server 120 is configured to generate the image fingerprint 125 utilizing a hash function, a cryptographic hash function, a checksum, a digest, various combinations thereof, and the like.

In some embodiments, validating nodes throughout the CI/CD pipeline, validating nodes in a production environment 150, and the like, are utilized to validate a virtual instance based on a fingerprint.

For example, according to an embodiment, a sensor, an admission controller, a command line interface (CLI), and the like, are configured to generate a fingerprint of an image file, and validate the generated fingerprint with a fingerprint server 120. In some embodiments, validating a fingerprint includes sending a generated fingerprint to the fingerprint server 120, which is configured to compare a received fingerprint with at least a fingerprint of a validated image of the fingerprint server 120.

This is further advantageous as it allows to retroactively invalidate an image which is deployed, which is not otherwise possible with a signed image. In certain embodiments, the fingerprint server 120 includes a plurality of validated fingerprints, and provides an application programming interface (API) through which a fingerprint can be validated. Having a public fingerprint server for validating software images is advantageous as a single source of truth.

Figure 2:
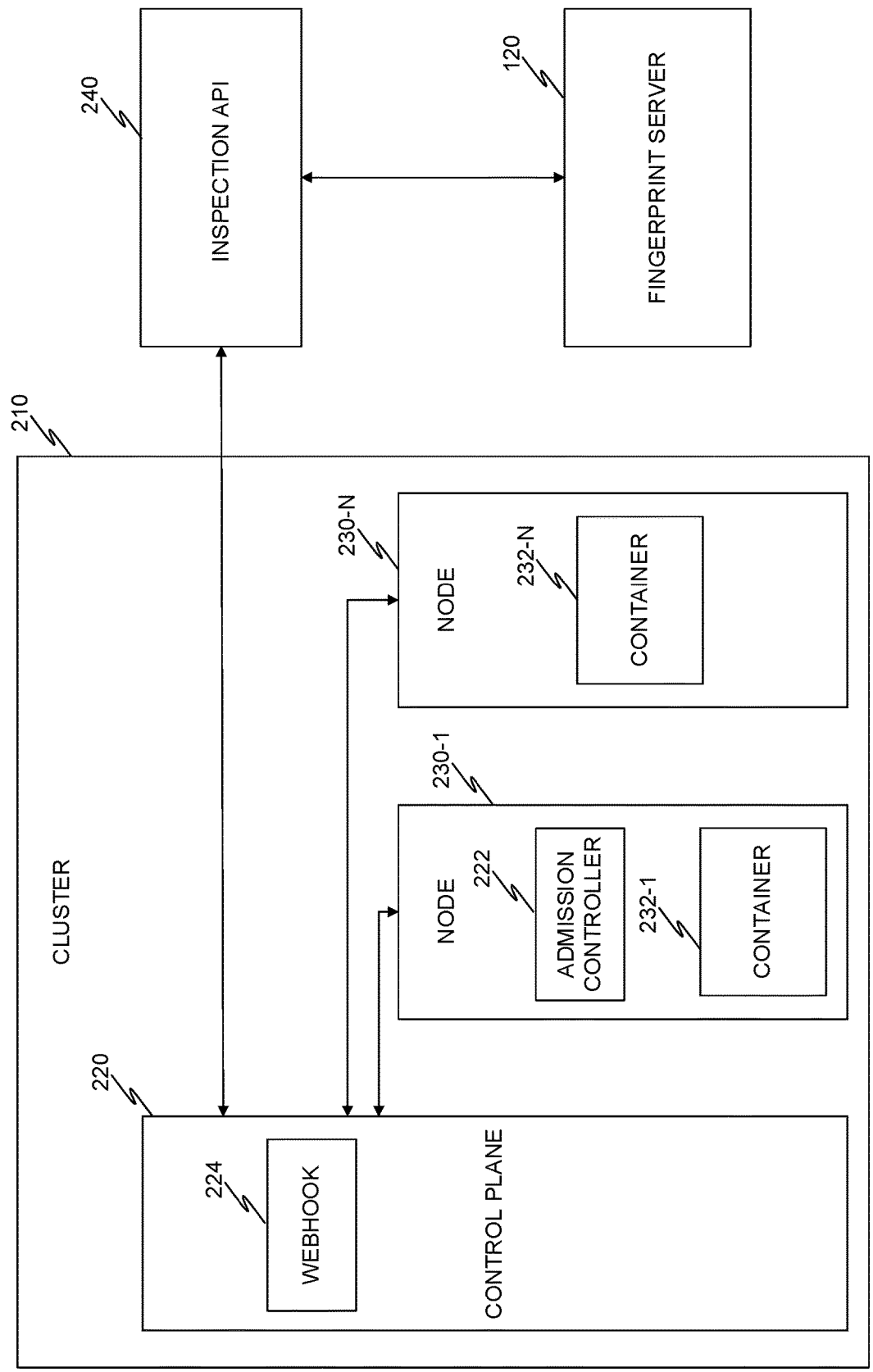
FIG. 2 is an example of a schematic diagram of a software container cluster having an admission controller for signatureless validation, implemented in accordance with an embodiment.

FIG. 2 is an example of a schematic diagram of a software container cluster having an admission controller for signatureless validation, implemented in accordance with an embodiment.

In some embodiments, a software container cluster 210 is implemented utilizing a Kubernetes® platform, a Docker® Engine, and the like. In certain embodiments, a software container cluster 210 is configured to deploy a plurality of software containers. In an embodiment, a software container is a containerized software application.

In certain embodiments, a container cluster 210 includes a control plane 220 configured to communicate with an inspection application programming interface (API) 240, and a plurality of nodes 230-1 through 230-N, where 'N' is an integer having a value of '2' or greater, individually referred to as node 230 and collectively referred to as nodes 230.

In an embodiment, the control plane 220 is implemented on a single machine in the cluster. In some embodiments, the machine on which the control plane 220 is implemented only executes components of the control plane 220. For example, in an embodiment, the machine does not include a container based on a user-generated image, base image, and the like.

For example, in some embodiments, a Kubernetes container cluster control plane 220 includes components such as an API server, a key value store, a scheduler, a controller, and the like. In an embodiment, the API server is implemented as a kube-apiserver, which is configured to expose the Kubernetes API to external resources. In certain embodiments, the key value store is configured to store key values, cluster data, and the like.

In some embodiments, the controller includes a node controller, a job controller, a service account controller, and the like. In certain embodiments, the control plane 220 includes a webhook 224. In an embodiment, the webhook 224 is a validating webhook, a mutating webhook, and the like. In an embodiment, a webhook 224 is configured to detect a request to an API, to another node in the cluster, and the like. In certain embodiments, the webhook 224 is further configured to send the request to an admission controller 222. In an embodiment, the cluster 210 includes a plurality of nodes 230-1 through 230-N.

In certain embodiments, each node 230 includes a container 232. In some embodiments, the container 232 includes a containerized software application. In certain embodiments, a node 230 includes a plurality of containers, an agent, a network proxy, a combination thereof, and the like. In an embodiment, a containerized software application includes a software, dependencies of the software, a combination thereof, and the like.

In certain embodiments, an inspection API 240 is configured to expose resources, communication, and the like, with a cloud computing environment. For example, in an embodiment, a cloud computing environment is a virtual private cloud (VPC), a virtual network (VNet), and the like, deployed on a cloud computing infrastructure. In an embodiment, a cloud computing infrastructure is Amazon® Web Services (AWS), Google® Cloud Platform (GCP), Microsoft® Azure, and the like. In certain embodiments, the control plane 220 of the cluster 210 is configured to communicate through the inspection API 240.

In some embodiments, an admission controller 222 is deployed on a node 230-1. In an embodiment, an admission controller 222 is configured to receive intercepted requests to the API server of the control plane 220. For example, in an embodiment, a software container 232-N is configured to communicate through a node 230-N to an API server of the control plane 220, which in turn is configured to communicate with the inspection API 240.

In certain embodiments, the admission controller 222 is implemented as computer software deployed on a node of the cluster 210. In some embodiments, the admission controller 222 is configured to communicate with a fingerprint server 120, for example through the inspection API 240.

In some embodiments, the admission controller 222 is configured to initiate a fingerprint validation from the fingerprint server 120. For example, in an embodiment, the admission controller 222 is configured to generate, cause generation of, receive, etc. a fingerprint of a software image. In some embodiments, the generated fingerprint is sent from the admission controller 222 to the fingerprint server 120 in order to determine if the fingerprint is of a valid image.

In an embodiment, the admission controller 222 is configured to allow deployment of an image, for example as container 232-N, in response to authenticating the fingerprint with the fingerprint server 120. In certain embodiments, the admission controller 222 is configured to deny deployment of the image, in response to failing to authenticate the fingerprint with the fingerprint server 120.

In some embodiments, the admission controller is further configured to apply a policy to requests of a node. In an embodiment, a policy includes a conditional rule. For example, in an embodiment, a policy includes a conditional rule, utilized to check if a network communication is directed to an IP address which is on a list of banned IP addresses. In an embodiment, a request is generated by a software container 232-N to send a network message, the request including a destination address (e.g., an IP address). In an embodiment, the request is delivered from the node 230-N to the control plane 220, where the request is intercepted by the webhook 224. The request is sent to the admission controller 222, which is configured to apply a policy on the request.

In some embodiments, the admission controller 222 is configured to apply a policy to the request. For example, in an embodiment, the admission controller 222 is configured to apply a conditional rule such that if a communication is directed to an IP address stored in a list of blocked IP addresses, the communication is denied, and the request is not passed to the inspection API 240. In certain embodiments, the admission controller 222 is configured to apply a conditional rule such that if a communication is not directed to an IP address stored in a list of blocked IP addresses, the communication is allowed to pass through, and is forwarded, for example, to the inspection API 240.

In an embodiment, the admission controller 222 is configured to apply a conditional rule such that if a communication is directed to an IP address stored in a list of allowed IP addresses, the communication is allowed, and the request is passed to the inspection API 240. In some embodiments, the admission controller 222 is configured to apply a conditional rule such that if a communication is not directed to an IP address stored in a list of allowed IP addresses, the communication is denied, and the request is not passed to the inspection API 240.

Figure 3:
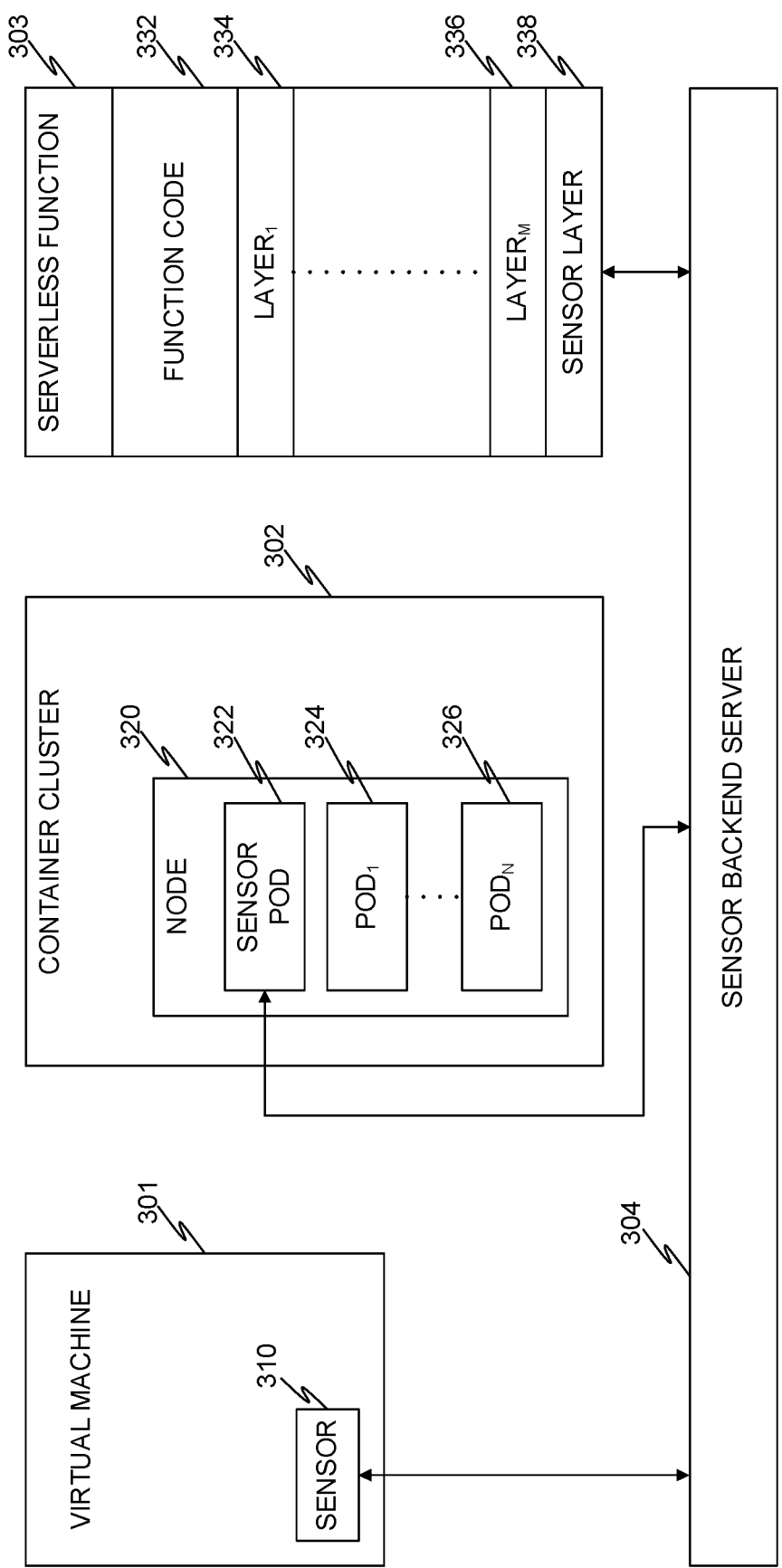
FIG. 3 is an example schematic illustration of a sensor backend server communicating with a plurality of sensors deployed on various workloads for signatureless validation, implemented in accordance with an embodiment.

FIG. 3 is an example schematic illustration of a sensor backend server communicating with a plurality of sensors deployed on various workloads for signatureless validation, implemented in accordance with an embodiment.

In some embodiments, a sensor backend server 304 is configured to communicate with a machine (not shown) having a sensor installed thereon and communicatively coupled with the sensor backend server 304. In an embodiment, the machine is a bare metal machine, a computer device, a networked computer device, a laptop, a tablet, and the like computing devices.

In an embodiment, a sensor backend server 304 is implemented as a virtual machine, a software container, a serverless function, a combination thereof, and the like. In certain embodiments, a plurality of sensor backend servers 304 may be implemented. In some embodiments where a plurality of sensor backend servers 304 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc.

In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

According to an embodiment, a virtual machine 301 includes a sensor 310. In an embodiment, the sensor 310 is deployed as a service executed on the virtual machine 301. In some embodiments, a virtual machine 301 is configured to request binary code, a software package, and the like, for example from a sensor backend sever 304, which when executed by the virtual machine 301 cause a sensor 310 to run as a service on the virtual machine 301. The sensor 310 is configured to listen to a data link layer communication, for example through an eBPF interface.

In some embodiments, a container cluster 302 runs a daemonset, and includes a plurality of nodes, such as node 320. The daemonset ensures that each node 320 runs a daemonset pod 322, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 324 through pod-N 326, where 'N' is an integer having a value of '1' or greater. The daemonset pod 322 is configured, in an embodiment, to communicate with the sensor backend server 304.

A serverless function 303 includes, in an embodiment, a function code 332, and a plurality of code layers 1 through M (labeled respectively as 334 through 336), where 'M' is an integer having a value of '1' or greater. For example, in AWS Lambda a layer contains, in an embodiment, code, content, a combination thereof, and the like. In some embodiments, a layer, such as layer 334 includes runtime data, configuration data, software libraries, and the like.

In certain embodiments, the serverless function 303 includes a sensor layer 338. The sensor layer 338 is configured, in an embodiment, to listen to a data link layer communication of the serverless function 303, for example through an eBPF interface.

The sensor service 310, daemonset pod 322, and sensor layer 338 are each an implementation of a sensor, according to an embodiment. In an embodiment, a sensor is configured to communicate with a sensor backend server 304 through a transport layer protocol, such as TCP. For example, the sensor backend server 304 is configured, in an embodiment, to listen to a predetermined port using a TCP protocol, and a sensor, such as sensor 310, daemonset pod 322, and sensor layer 338 are each configured to communicate with the backend sensor server 304, for example by initiating communication using TCP over the predetermined port.

In certain embodiments, the sensor is configured to initiate an action on a virtual instance (e.g., on a virtual machine, a software container, a serverless function, etc.). In an embodiment, the sensor is configured to generate a fingerprint of an image associated with the virtual instance. In some embodiments, the sensor is configured to send the fingerprint for validation to a fingerprint server, for example through the sensor backend server 304.

Figure 4:
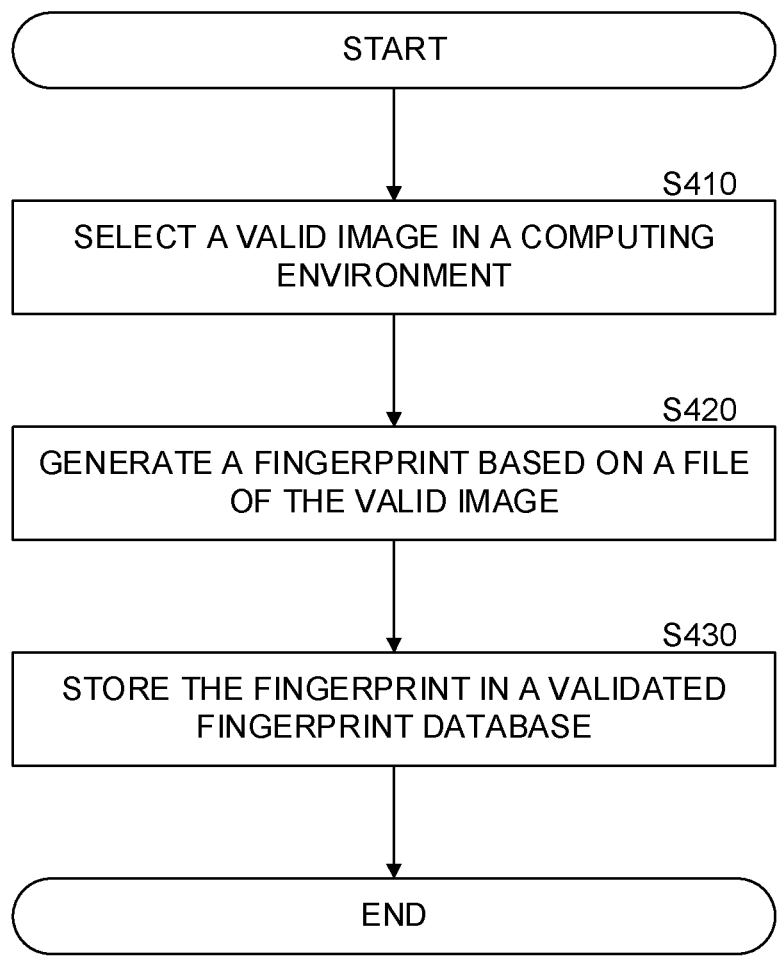
FIG. 4 is a flowchart of a method for generating a fingerprint for signatureless validation of a software image in a computing environment, implemented in accordance with an embodiment.

FIG. 4 is a flowchart of a method for generating a fingerprint for signatureless validation of a software image in a computing environment, implemented in accordance with an embodiment.

At S410, a valid image is selected. In an embodiment, a preauthorized principal is provided with a permission, an authorization, and the like, to select a valid image (e.g., a valid virtual image). In an embodiment, selecting a valid image is performed only by a preauthorized principal. In some embodiments, a preauthorized principal is a user account, such as an administrator account.

In some embodiments, selecting a valid image includes selecting an image from a repository, from a database, from a storage in a computing environment, and the like.

At S420, a fingerprint is generated. In some embodiments, the fingerprint is generated based on a valid image. In an embodiment, in response to selecting an image as valid, indicating that the image is valid, etc., fingerprint generation is initiated.

In an embodiment, the fingerprint is generated utilizing a hash function, a cryptographic hash function, a checksum, a digest, various combinations thereof, and the like.

In some embodiments, the software image based on which the fingerprint is generated is not perturbed. This is in distinction to a signed image, where the image file is modified to include the signature. In certain embodiments, a signed image is selected for generating a fingerprint therefrom.

At S430, the fingerprint is stored. In an embodiment, the fingerprint is stored in a fingerprint database, a bucket, a fingerprint server, a plurality of locations, and the like. In certain embodiments, a fingerprint is stored as a token, such as a non-fungible token, on a blockchain, to avoid tampering with the fingerprint.

This is advantageous for example, where a storage is otherwise publicly accessible, or potentially publicly accessible, and would open up a threat which would allow an attacked to plant allegedly authorized fingerprints in the validated fingerprint databases, which are not truly validated.

Figure 5:
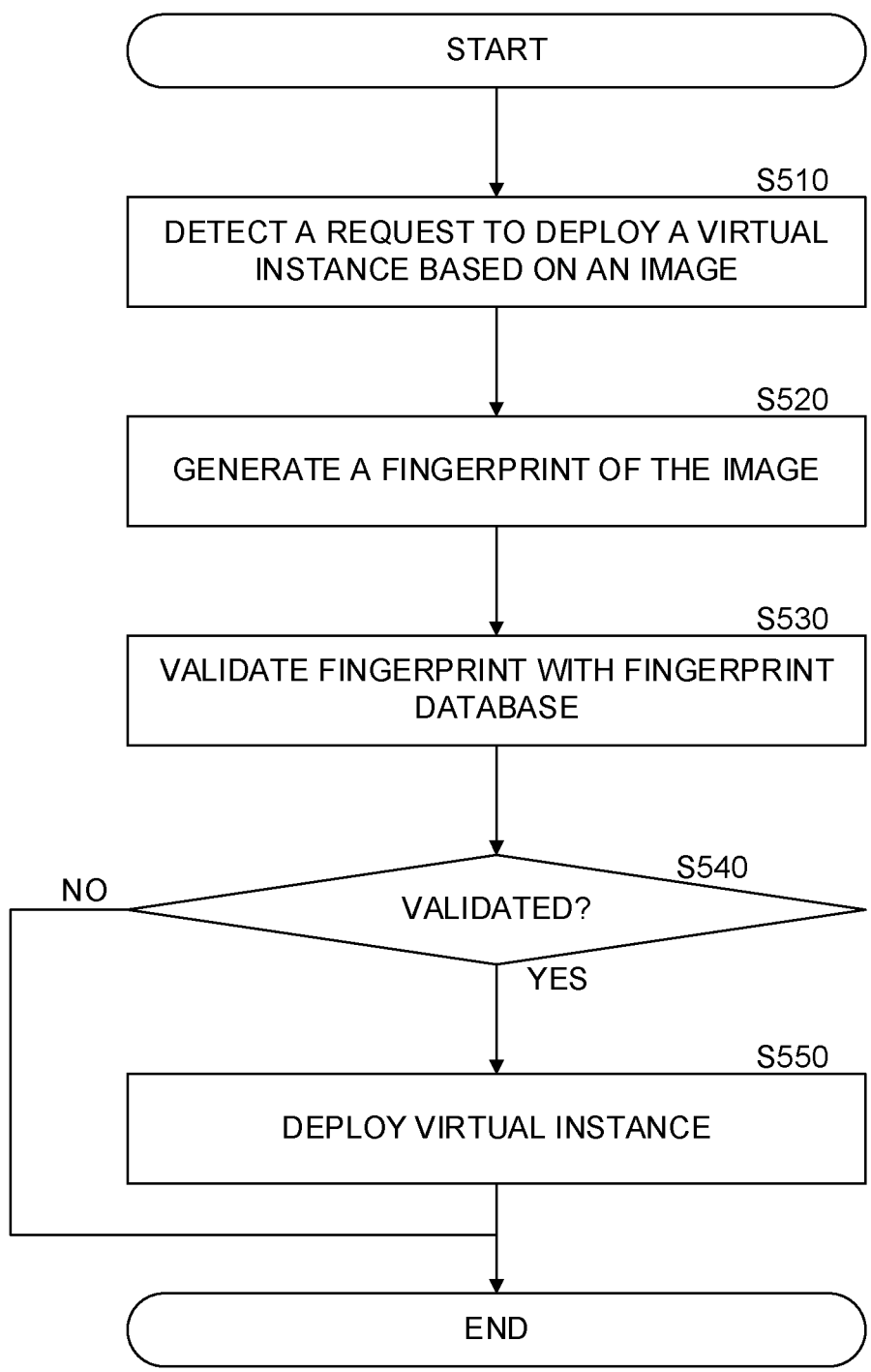
FIG. 5 is a flowchart of a method for performing signatureless validation of a software image in a computing environment, implemented in accordance with an embodiment.

FIG. 5 is a flowchart of a method for performing signatureless validation of a software image in a computing environment, implemented in accordance with an embodiment.

At S510, a request to deploy a virtual instance is detected. In some embodiments, the request to deploy a virtual instance includes a software image, based on which the virtual instance is deployed.

In an embodiment, a request to deploy the virtual instance is received by an admission controller. In some embodiments, the admission controller is deployed in a software container cluster, and is configured to perform a method described herein.

In some embodiments, the request to deploy the virtual instance is detected by a hypervisor which is configured to deployed virtual machines. In certain embodiments, the request to deploy the virtual instance is detected by a serverless function, for example as a layer of the serverless function.

In some embodiments, an image of a virtual instance is detected through inspection. For example, in an embodiment, an inspector workload is configured to inspect a disk, such as a disk associated with a virtual machine, for a cybersecurity object. In some embodiments, the cybersecurity object is a nested workload.

For example, a disk of a virtual machine is inspected to detect thereon a software container platform hosted thereon, such that the software container platform is a nested workload in the virtual machine.

In an embodiment, inspection includes generating an inspectable disk from an original disk detected in a computing environment. In some embodiments, the inspectable disk is generated based on a clone, a copy, a snapshot, and the like, of an original disk.

At S520, a fingerprint is generated. In an embodiment, the fingerprint is generated based on the image of the virtual instance. In some embodiments, the fingerprint is generated by an admission controller, by a sensor, by a fingerprint server, a combination thereof, and the like.

In an embodiment, a fingerprint is generated utilizing a hash function, a cryptographic hash function, a checksum, a digest, various combinations thereof, and the like. In certain embodiments, a plurality of fingerprints are generated, each generated utilizing a different method.

In some embodiments, a fingerprint server includes a fingerprint method identifier. For example, in an embodiment, a fingerprint server includes a method identifier, which indicates all fingerprints stored by the fingerprint server are generated utilizing a checksum. In another embodiment, a second fingerprint server includes a second method identifier, indicating that all fingerprints stored by the fingerprint server are generated utilizing a cryptographic hash function.

At S530, validation is initiated. In an embodiment, validating a fingerprint includes sending a generated fingerprint to a fingerprint server which is configured to generate a match between a received fingerprint and a stored validated fingerprint, wherein the stored validated fingerprint corresponds to an image which is a valid image.

In some embodiments, an admission controller is configured to send a generated fingerprint to a fingerprint server and receive a response indicating that the image is valid or invalid.

In certain embodiments, a sensor deployed on a virtual machine, a serverless function, a software container, and the like, is configured to send a generated fingerprint to a fingerprint server and receive a response indicating that the image is valid or invalid.

At S540, a check is performed to determine if validation of the image is successful. In an embodiment, where the image is a valid image, execution continues at S550. In certain embodiments, where the image is an invalid image, execution terminates. In some embodiments, where the image is an invalid image, execution continues at S520 and a second fingerprint is generated of the image, utilizing a different method of generation than a previous method.

At S550, the virtual instance is deployed. In an embodiment, deploying a virtual instance includes deploying the virtual instance based on a validated image of the virtual instance. In some embodiments, deploying a virtual instance includes deploying a serverless function, deploying a node in a container, deployed a virtual machine, various combinations thereof, and the like.

In certain embodiments, the teachings herein are applied to other artifacts in a computing environment. For example, in some embodiments, a fingerprint is generated for various files, libraries, binaries, computer code, combinations thereof, and the like. In an embodiment, an artifact store of a computing environment is inspected for image, binaries, code objects, and the like. For example, according to an embodiment, Bitcucket™ is an artifact store, e.g., a Git-based repository.

In some embodiments, a policy engine is configured to determine which objects, entities, and the like, in a computing environment, such as a cloud computing environment, require fingerprints. For example, in an embodiment, the policy engine includes a policy which when applied authorizes only objects having a valid fingerprint to be deployed in a computing environment.

In certain embodiments, where a virtual machine, a software container, a serverless function, and the like, are detected which are virtual instances deployed based on an image which has an invalid fingerprint (or does not have a valid fingerprint), a computing environment is configured to terminate such a virtual instance.

For example, in an embodiment, a sensor is configured to block a process in real time, wherein the process does not have a valid fingerprint, or has an invalid fingerprint. In an embodiment, in response to detecting an invalid fingerprint, a remediation action is initiated.

In an embodiment, a remediation action includes terminating a virtual instance, sandboxing a virtual instance, revoking permission from a principal which deployed the virtual instance, a combination thereof, and the like.

Figure 6:
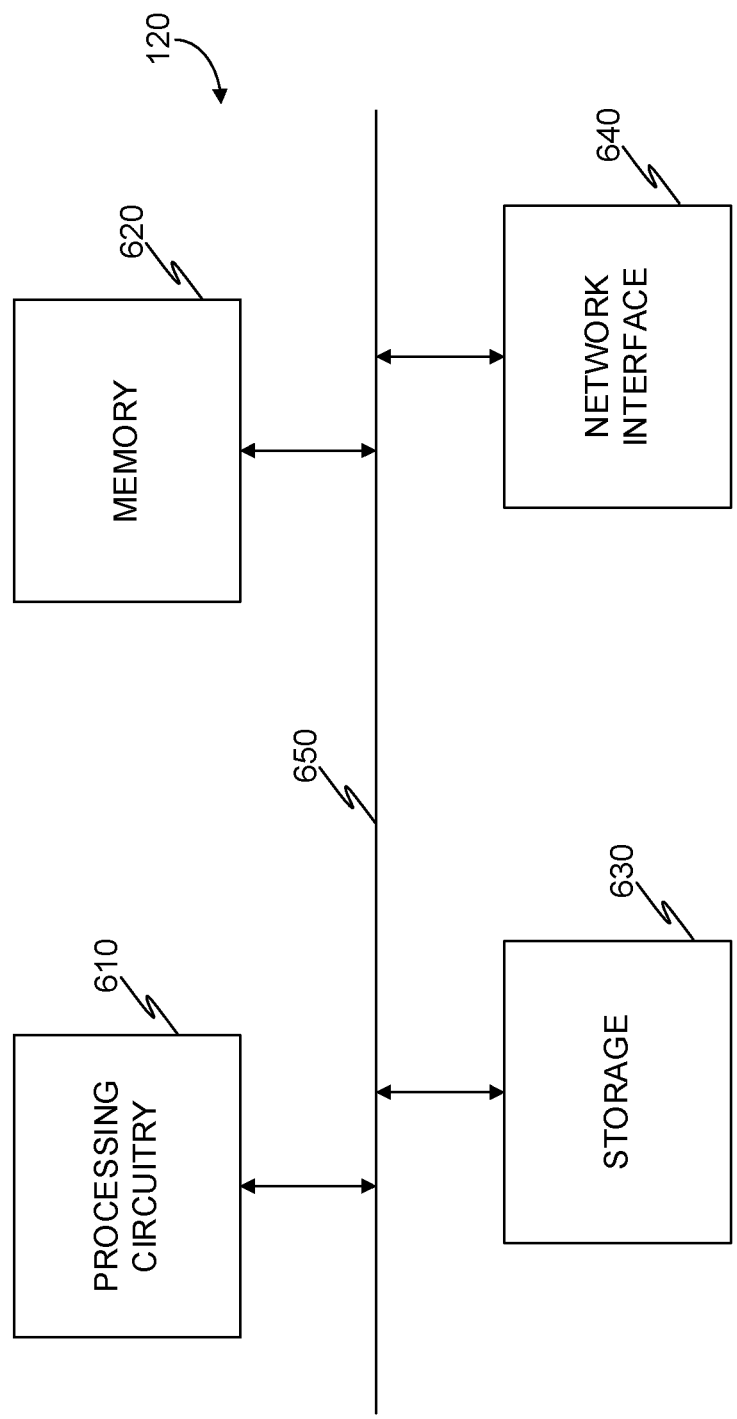
FIG. 6 is an example schematic diagram of a fingerprint server according to an embodiment.

FIG. 6 is an example schematic diagram of a fingerprint server 120 according to an embodiment. The fingerprint server 120 includes a processing circuitry 610 coupled to a memory 620, a storage 630, and a network interface 640. In an embodiment, the components of the fingerprint server 120 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the fingerprint server 120 with communication with, for example, an image repository 110, a test environment 130, a staging environment 140, a production environment 150, components thereof, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for signatureless validation of virtual images in a computing environment, comprising:
   detecting a request to deploy an instance based on a software artifact in the computing environment;
   generating a first fingerprint based on the software artifact in response to detecting the request to deploy the instance;
   querying a fingerprint database, including a plurality of validated fingerprints, to determine if the first fingerprint is stored therein;
   deploying the instance in response to a signatureless validation of the first fingerprint; and
   blocking deployment of the instance in response to determining the first fingerprint is not of the plurality of validated fingerprints.

2. The method of claim 1, further comprising:
   inspecting the software artifact for a cybersecurity issue; and
   generating a validated fingerprint based on the software artifact in response to determining that the software artifact does not include a cybersecurity issue.

3. The method of claim 2, wherein generating the validated fingerprint is initiated by a preauthorized principal of the computing environment.

4. The method of claim 1, further comprising:
   accessing an artifact file in the computing environment;
   generating a second fingerprint based on the artifact file; and
   storing the second fingerprint as a validated fingerprint in the fingerprint database.

5. The method of claim 1, further comprising:
   detecting a virtual instance deployed in the computing environment;
   generating a fingerprint based on the deployed virtual instance; and
   terminating the virtual instance in response to determining that the fingerprint of the deployed virtual instance is invalid.

6. The method of claim 1, further comprising:
   generating a fingerprint for each object of a plurality of objects detected in the computing environment at a first time; and
   storing the generated fingerprints as valid fingerprints.

7. The method of claim 6, further comprising:
   generating a fingerprint for an object detected in the computing environment at a second time; and
   querying the fingerprint database with a fingerprint generated at the second time to determine if the fingerprint is a valid fingerprint.

8. The method of claim 7, further comprising:
   determining that the object detected at the second time is an unauthorized object in response to detecting that the generated fingerprint does not match the valid fingerprints.

9. The method of claim 8, further comprising:
   terminating the object detected at the second time.

10. The method of claim 8, further comprising:
    initiating a remediation action.

11. The method of claim 1, wherein the request is detected by any one of: an admission controller, a hypervisor, a sensor, and a combination thereof.

12. A non-transitory computer-readable medium storing a set of instructions for signatureless validation of virtual images in a computing environment, the set of instructions comprising:
    one or more instructions that, when executed by one or more processors of a device, cause the device to:
    detect a request to deploy an instance based on a software artifact in the computing environment;
    generate a first fingerprint based on the software artifact in response to detecting the request to deploy the instance;
    query a fingerprint database, including a plurality of validated fingerprints, to determine if the first fingerprint is stored therein;
    deploy the instance in response to signatureless validation of the first fingerprint; and
    block deployment of the instance in response to determining the first fingerprint is not of the plurality of validated fingerprints.

13. A system for signatureless validation of virtual images in a computing environment comprising:
    a processing circuitry;
    a memory, the memory containing instructions that, when executed by the processing circuitry, configure the system to:
    detect a request to deploy an instance based on a software artifact in the computing environment;
    generate a first fingerprint based on the software artifact in response to detecting the request to deploy the instance;
    query a fingerprint database, including a plurality of validated fingerprints, to determine if the first fingerprint is stored therein;
    deploy the instance in response to signatureless validation of the first fingerprint; and
    block deployment of the instance in response to determining the first fingerprint is not of the plurality of validated fingerprints.

14. The system of claim 13, wherein the memory contains further instructions which when executed by the processing circuitry further configure the system to:
    inspect the software artifact for a cybersecurity issue; and
    generate a validated fingerprint based on the software artifact in response to determining that the software artifact does not include a cybersecurity issue.

15. The system of claim 14, wherein generating the validated fingerprint is initiated by a preauthorized principal of the computing environment.

16. The system of claim 13, wherein the memory contains further instructions which when executed by the processing circuitry further configure the system to:
- access an artifact file in the computing environment;
- generate a second fingerprint based on the artifact file; and
- store the second fingerprint as a validated fingerprint in the fingerprint database.

17. The system of claim 13, wherein the memory contains further instructions which when executed by the processing circuitry further configure the system to:
- detect a virtual instance deployed in the computing environment;
- generate a fingerprint based on the deployed virtual instance; and
- terminate the virtual instance in response to determining that the fingerprint of the deployed virtual instance is invalid.

18. The system of claim 13, wherein the memory contains further instructions which when executed by the processing circuitry further configure the system to:
- generate a fingerprint for each object of a plurality of objects detected in the computing environment at a first time; and
- store the generated fingerprints as valid fingerprints.

19. The system of claim 18, wherein the memory contains further instructions which when executed by the processing circuitry further configure the system to:
- generate a fingerprint for an object detected in the computing environment at a second time; and
- query the fingerprint database with a fingerprint generated at the second time to determine if the fingerprint is a valid fingerprint.

20. The system of claim 19, wherein the memory contains further instructions which when executed by the processing circuitry further configure the system to:
- determine that the object detected at the second time is an unauthorized object in response to detecting that the generated fingerprint does not match the valid fingerprints.

21. The system of claim 20, wherein the memory contains further instructions which when executed by the processing circuitry further configure the system to:
- terminate the object detected at the second time.

22. The system of claim 20, wherein the memory contains further instructions which when executed by the processing circuitry further configure the system to:
- initiate a remediation action.

23. The system of claim 13, wherein the request is detected by any one of:
- an admission controller, a hypervisor, a sensor, and a combination thereof.

* * * * *